No. 853,833. PATENTED MAY 14, 1907.
G. SAUM, Jr.
FRUIT GATHERER.
APPLICATION FILED MAR. 27, 1906.

Witnesses

Inventor
George Saum Jr,
By Victor J. Evans
Attorney

UNITED STATES PATENT OFFICE.

GEORGE SAUM, JR., OF SHERWOOD, OREGON.

FRUIT-GATHERER.

No. 853,833.  Specification of Letters Patent.  Patented May 14, 1907.

Application filed March 27, 1906. Serial No. 308,318.

*To all whom it may concern:*

Be it known that I, GEORGE SAUM, Jr., a citizen of the United States, residing at Sherwood, in the county of Washington and State of Oregon, have invented new and useful Improvements in Fruit-Gatherers, of which the following is a specification.

This invention relates to fruit gatherers of the type embodying a cloth receptacle adapted to be temporarily suspended beneath a tree, and has for its objects to produce a comparatively simple, inexpensive device of this character which may be conveniently transported from place to place and readily positioned for use, one which when in applied position will be properly distended to effectually hold the fruit, and one which may be folded into compact form for transportation.

With these and other objects in view, the invention comprises the novel features of construction and combination of parts more fully hereinafter described.

Figure 1:
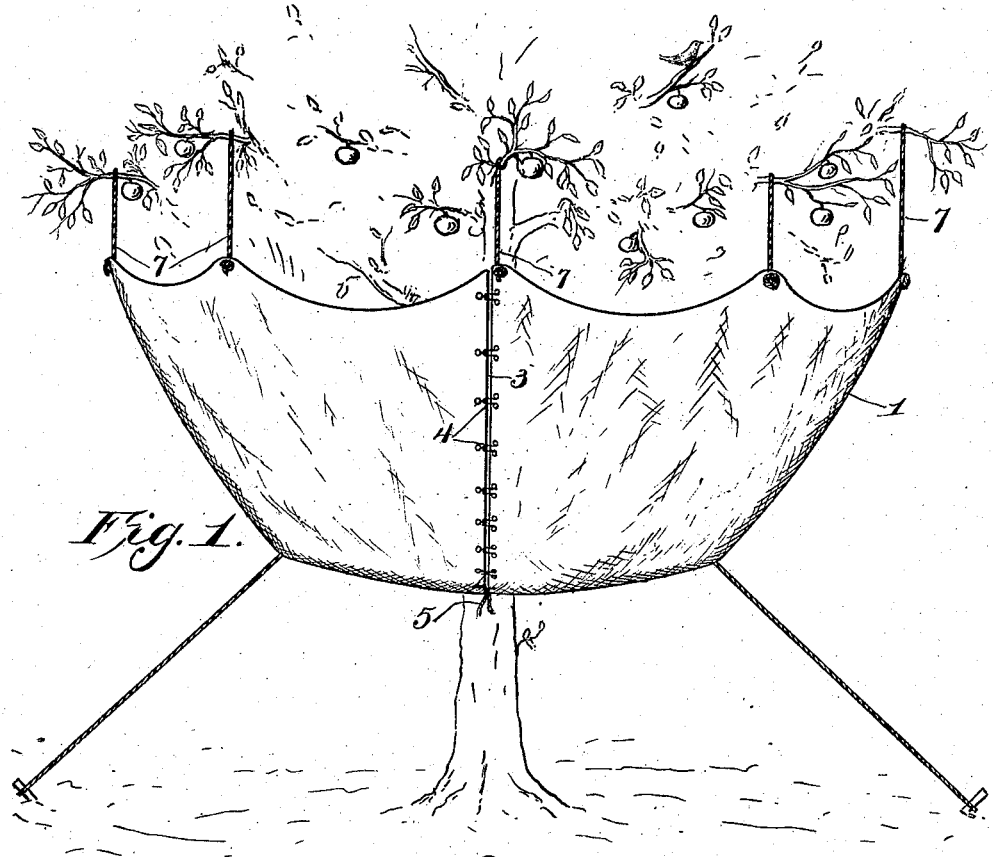
Figure 2:
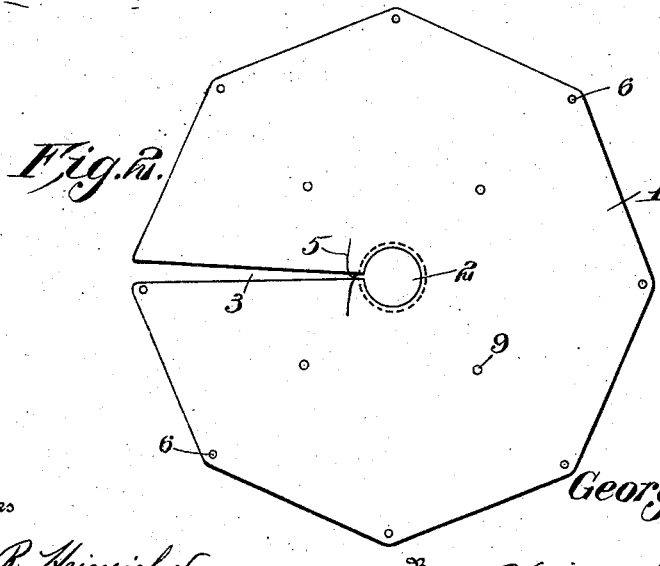

In the accompanying drawings: Figure 1 is a side elevation of a fruit gatherer embodying the invention and showing the same applied for use. Fig. 2 is a plan view of the receptacle showing the same on a smaller scale.

Referring to the drawings, 1 designates the fruit collecting member or receptacle composed of canvas or other suitable pliable material and preferably of octagonal form, as seen in Fig. 2, said receptacle, which has a central opening 2 designed to receive and snugly embrace the trunk of a tree, being slit or divided radially as at 3 to permit its application to the tree and having attached to the edges of the opening 3 hooks and eyes or other fastening members 4 for closing the opening, while applied around the central opening 2 is a draw string 5 for use in attaching the member at its center to the trunk of the tree.

Threaded through openings or perforations 6 at the corners of the sheet 1 are suspending cords or elements 7, while terminally engaged with the member at suitable points preferably midway between its center and margin is a plurality of flexible bracing elements or cords 8 adapted for engagement with the member through the medium of openings or perforations 9.

In practice, the member 1 is applied to a tree as illustrated in Fig. 1 by engaging the same centrally with the trunk of the tree at a point above the ground and thereafter attaching the cord 7 to the limbs of the tree for holding the member in suspended condition and substantially in the form of an inverted umbrella for the reception of the fruit when tree is shaken, it being understood, of course, that after the receptacle has been applied the opening 3 will be closed by means of the fastening members 4. After the receptacle has been properly suspended it is braced and stretched by means of the cords 8 which are pegged to the ground as seen in Fig. 1, it being noted in this connection that the cords serve to distend the receptacle in such manner that it will present a substantially horizontal bottom portion and obviate the fruit running to and causing the receptacle to sag or give way at its center.

It is to be particularly observed that under my improved construction the employment of stakes for supporting the canvas body or slats for distending the same is wholly obviated, thus obviating liability of the fruit becoming bruised or damaged on falling into the receptacle, and further that by dispensing with the stakes and slats the device may be more conveniently transported from tree to tree and may be reduced to more compact form for purposes of storing.

Having thus described my invention, what I claim is:

A device of the class described comprising a sheet of pliable material adapted for application to a tree and provided with an opening to receive the tree trunk, said sheet being slitted radially from said opening to its marginal edge, means for closing the slit when the sheet is applied, flexible suspending elements attached at spaced intervals to and adjacent the margin of the sheet for suspending the device from the limbs of the tree and serving as the sole means of supporting the device, flexible stretching elements engaged with the sheet at points between its margin and center and serving to distend the sheet for holding the bottom thereof in a substantially horizontal plane, said suspending and stretching elements being extended in relatively reverse directions, and means for engaging the stretching elements with the ground.

In testimony whereof, I affix my signature in presence of two witnesses.

GEORGE SAUM, JR.

Witnesses:
 G. E. HAYES,
 W. E. MUMPOWER.